(12) United States Patent
Pham

(10) Patent No.: US 10,385,864 B2
(45) Date of Patent: Aug. 20, 2019

(54) COMPRESSOR WHEEL OF A CHARGING DEVICE

(71) Applicant: Bosch Mahle Turbo Systems GmbH & Co. KG, Stuttgart (DE)

(72) Inventor: Kinh Toai Pham, Ludwigsburg (DE)

(73) Assignee: BMTS Technology GmbH & Co. KG (DE)

( * ) Notice: Subject to any disclaimer, the term of this patent is extended or adjusted under 35 U.S.C. 154(b) by 431 days.

(21) Appl. No.: 15/227,943

(22) Filed: Aug. 3, 2016

(65) Prior Publication Data

US 2017/0037864 A1 Feb. 9, 2017

(30) Foreign Application Priority Data

Aug. 4, 2015 (DE) .......................... 10 2015 214864

(51) Int. Cl.
  *F01D 5/04* (2006.01)
  *F02C 6/12* (2006.01)
  *F02B 33/00* (2006.01)
  *F02B 37/00* (2006.01)
  *F04D 25/04* (2006.01)
  (Continued)

(52) U.S. Cl.
  CPC ............. *F04D 29/26* (2013.01); *F01D 5/021* (2013.01); *F01D 5/043* (2013.01); *F01D 5/048* (2013.01); *F02B 33/00* (2013.01); *F02B 37/00* (2013.01); *F02C 6/12* (2013.01); *F04D 25/04* (2013.01); *F04D 29/284* (2013.01); *F05B 2220/40* (2013.01); *F05B 2240/30* (2013.01); *F05D 2220/40* (2013.01); *F05D 2250/611* (2013.01); *Y02T 10/144* (2013.01)

(58) Field of Classification Search
  CPC ........ F01D 5/048; F04D 29/26; F04D 29/284; F02C 6/12; F05B 2220/40; F05D 2220/40
  See application file for complete search history.

(56) References Cited

U.S. PATENT DOCUMENTS 1,796,057 A 3/1931 Smith
6,164,931 A 12/2000 Norton et al.
(Continued)

FOREIGN PATENT DOCUMENTS

EP 1137866 A1 10/2001
EP 1809907 A1 2/2010
(Continued)

OTHER PUBLICATIONS

European Search Report dated Dec. 1, 2016 in relation to EP 16 180 151.9.
German Search Report for 102015214864.5, dated Jun. 16, 2016.

*Primary Examiner* — Ninh H. Nguyen
*Assistant Examiner* — Brian P Wolcott
(74) *Attorney, Agent, or Firm* — Fishman Stewart PLLC

(57) ABSTRACT

A compressor wheel of a charging device may include a hub, a plurality of blades and a wheel back. The wheel back may have an undulating profile which extends from the hub in a radial direction. The undulating profile may include a plurality of regions. The plurality of regions may adjoin one another and may include a first concave region, a second convex region, a third concave region, and a fourth convex region. The second convex region may adjoin the first concave region. The third concave region may adjoin the second convex region. The fourth convex region may adjoin the third concave region.

20 Claims, 1 Drawing Sheet

(51) Int. Cl.
*F04D 29/26* (2006.01)
*F04D 29/28* (2006.01)
*F01D 5/02* (2006.01)

(56) References Cited

U.S. PATENT DOCUMENTS

| | | | |
|---|---|---|---|
| 6,224,321 B1 | 5/2001 | Ebden et al. | |
| 7,189,062 B2 * | 3/2007 | Fukizawa | F04D 25/04 |
| | | | 416/185 |
| 8,936,439 B2 * | 1/2015 | Duong | F01D 5/048 |
| | | | 416/185 |
| 9,803,654 B2 * | 10/2017 | Yagi | F04D 25/163 |
| 9,874,100 B2 * | 1/2018 | Otsubo | F01D 5/027 |
| 2003/0136001 A1 | 7/2003 | Nishiyama et al. | |
| 2005/0111971 A1 | 5/2005 | Fukizawa et al. | |
| 2005/0169764 A1 | 8/2005 | Geoffrey Heyes et al. | |
| 2012/0036865 A1 | 2/2012 | Brillet et al. | |
| 2012/0183406 A1 * | 7/2012 | Yoshida | F01D 5/048 |
| | | | 416/219 R |

FOREIGN PATENT DOCUMENTS

| | | | |
|---|---|---|---|
| EP | 2417359 A1 | 2/2012 |
| GB | 2469489 A | 10/2010 |

* cited by examiner

COMPRESSOR WHEEL OF A CHARGING DEVICE

CROSS-REFERENCE TO RELATED APPLICATIONS

This application claims priority to German Patent Application No. 10 2015 214 864.5, filed Aug. 4, 2015, the contents of which are hereby incorporated by reference in its entirety.

TECHNICAL FIELD

The present invention relates to a compressor wheel of a charging device with a hub and blades emerging therefrom and also with a wheel back. The invention also relates to an exhaust gas turbocharger with such a compressor wheel.

BACKGROUND

EP 1 809 907 B1 discloses a compressor wheel of the type in question with an axis of rotation and a multiplicity of blades which generally extend radially away from the axis and generally extend axially from a surface of a disk-like holder, wherein the opposite surface of the holder defines a wheel back. At least one portion of the wheel back is provided here with a layer of residual compressive stress extending to a depth below the surface of the wheel back. This is intended in particular to reduce cracking.

U.S. Pat. No. 6,164,931 A likewise discloses a compressor wheel of the type in question, but the wheel back of which is of curved, that is to say in particular concave, design.

US 2005/0169764 A1 discloses a compressor wheel, the wheel back of which is of concave design, and wherein a seal is additionally arranged in an axial portion of the wheel back.

In general, compressor wheels are, because of their high rotational speeds, highly stressed components which have an increased tendency to cracking because of the forces acting upon them. In order to be able at least to reduce such a tendency to cracking, methods are known, for example from EP 1 809 907 B1, in which the compressor wheel is shot-peened.

Finally, US 2003/0136001 A1 also discloses another compressor wheel which has greater strength because of its special production method and, as a result, a lower tendency to cracking.

However, a disadvantage of the compressor wheels which are known from the prior art and which have been optimized with respect to their tendency to cracking is the comparatively high technical and monetary outlay required for this purpose.

SUMMARY

The present invention is therefore concerned with the problem of specifying, for a compressor wheel of the type in question, an improved or at least an alternative embodiment which is distinguished in particular by a reduced tendency to cracking and at the same time by cost-effective production.

This problem is solved according to the invention by the subject matter of independent Claim(s). Advantageous embodiments are the subject matter of the dependent claims.

The present invention is based on the general concept of designing a wheel back of a compressor wheel of a charging device to be undulating and, as a result, in the region of high stress loading, to provide additional convex portions which reinforce the compressor wheel in these regions and thereby make said compressor wheels more resistant to wear and in addition reduce a tendency to cracking. The compressor wheel according to the invention has in a known manner here a hub and blades and the previously mentioned wheel back. The wheel back itself has, according to the invention, an undulating profile which emerges from the hub in the radial direction, with regions which emerge from the hub in the radial direction and adjoin one another, namely a first concave region, a second convex region adjoining the latter to the outside in the radial direction, a third concave region adjoining the second convex region, and a fourth convex region adjoining the third concave region. In the case of the compressor wheel according to the invention, the second and the fourth region are therefore of convex design and, as a result, have a material accumulation in the form of a bulge which reinforces the compressor wheel in these regions and thereby reduces the tendency to cracking. By means of the local reinforcement of the compressor wheel, the tendency to cracking can be considerably reduced while a weight of the compressor wheel according to the invention is merely marginally increased.

In an advantageous development of the solution according to the invention, a bulge in the fourth convex region has an axial height h of approx. 0.15 mm. Even such a small material accumulation in the region of the bulge of the fourth convex region permits a significant reduction in stress and, as a result, a reduction in the tendency to cracking, which has been demonstrated in detail with tests. With reference to a diameter of the compressor wheel, it is appropriate to reproduce the bulge in the fourth convex region to a radius R4 which corresponds to a quarter of the diameter D of the compressor wheel ($R4 \approx D/4 = R/2$).

The hub expediently reaches from an axis of rotation of the compressor wheel as far as the first region and furthermore has a flat annular end surface. Via said flat end surface, said hub can bear, for example, against an axial stop of a shaft. In comparison to a conventional compressor wheel, the flat end surface can also be thickened, and therefore, for example, an additional application of material of approx. 0.8 to 1.2 mm is held here in the axial direction. However, in comparison to compressor wheels known from the prior art, an additional material accumulation is predominantly provided in the regions which are now convex, and therefore the concave regions according to the invention are only slightly thickened, if at all. The concave regions according to the invention could even have less material than previously, and therefore the material accumulations in the convex regions can thereby be at least partially compensated for. The convex and concave regions are configured here to the respectively anticipated stresses.

In an advantageous development of the solution according to the invention, the first region has a radial extent of approx. 7% of the radius of the compressor wheel, the second region has a radial extent of approx. 25%, the third region has a radial extent of approx. 30% and, finally, the fourth region has a radial extent of approx. 20% of the radius of the compressor wheel. The end surface has a radial extent of approx. 15% of the radius of the compressor wheel, wherein the individual % details may, of course, vary and are intended merely to impart relative ratios between the radial extent of individual regions. By means of such a selected radial extent of the individual regions, the tendency of the compressor wheel according to the invention to cracking can be significantly reduced.

The present invention is furthermore based on the general concept of equipping an exhaust gas turbocharger with such a previously described compressor wheel, as a result of which a particularly enduring exhaust gas turbocharger can be produced since the tendency of the compressor wheel to cracking can be significantly reduced because of the individual convex regions.

Further important features and advantages of the invention emerge from the dependent claims, from the drawings and from the associated description of the figures with reference to the drawings.

It goes without saying that the features mentioned above and those which have yet to be explained below can be used not only in the respectively stated combination, but also in different combinations or on their own without departing from the scope of the present invention.

Preferred exemplary embodiments of the invention are illustrated in the drawings and are explained in more detail in the description below, wherein identical reference numbers refer to identical or similar or functionally identical components.

DETAILED DESCRIPTION

Figure 1:
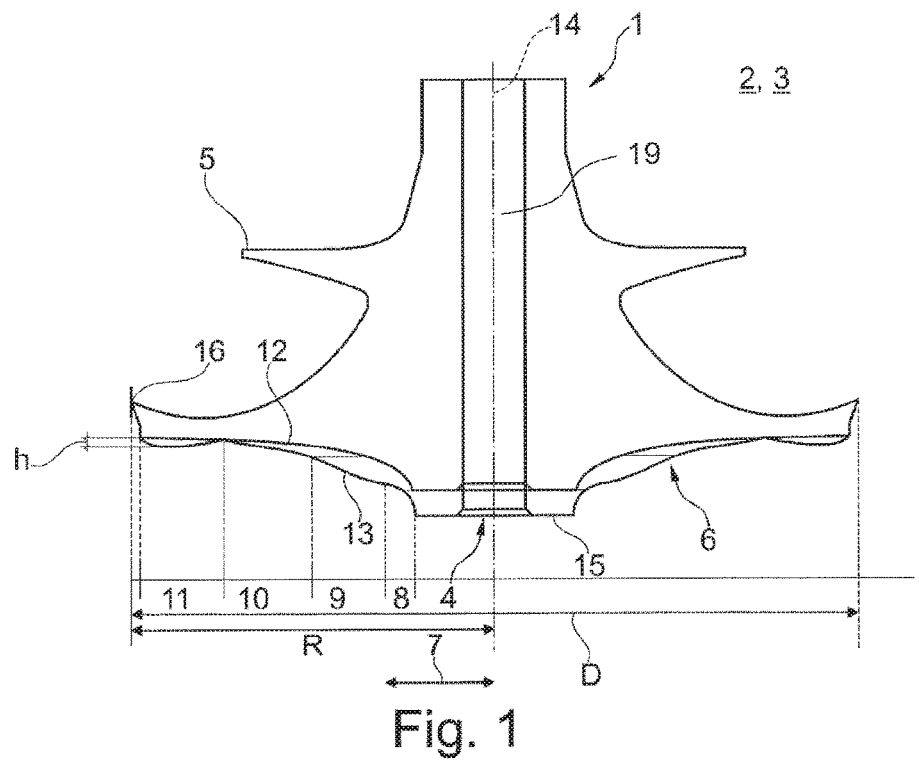
FIG. 1 shows a sectional illustration through a compressor wheel according to the invention.
Figure 2:
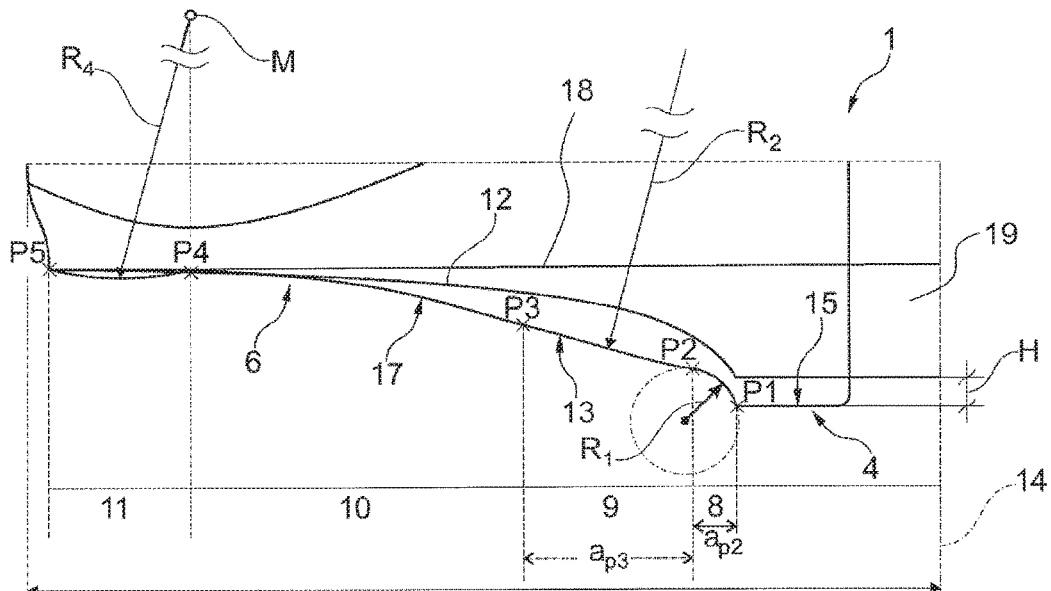
FIG. 2 shows a detailed illustration from FIG. 1.

According to FIG. 1 and partially to FIG. 2, a compressor wheel 1 according to the invention of a charging device 2 (otherwise merely indicated), in particular of an exhaust gas turbocharger 3, has a hub 4 and blades 5 and a wheel back 6. In order now to be able to reduce a tendency of the compressor wheel 1 to cracking and thereby to be able to extend the service life thereof, it is provided according to the invention that the wheel back 6 has an undulating profile which emerges from the hub 4 in the radial direction 7, with regions 8, 9, 10 and 11 emerging from the hub 4 in the radial direction, 7 and adjoining one another.

As can be clearly seen here in the left half of FIG. 1, the first region 8 is of concave design while the second region 9 which adjoins the latter in the radial direction 7 is of convex design. The third region 10 in turn adjoining the second convex region 9 is of concave design while the fourth region 11 is in turn of convex design. In FIG. 1, the original profile of the wheel back in the case of conventional compressor wheels is denoted by reference sign 12, while reference sign 13 denotes the undulating profile according to the invention.

The first concave region 8 here is rounded with a radius R1 which lies between 3.125% and 6% of the diameter D of the compressor wheel 1, while the second convex region 9 is rounded with a radius R2 which approximately corresponds to the diameter D of the compressor wheel 1. The first concave region 8 begins in the radial direction 7 at P1 and ends at P2. In this case, a radial distance between the points P1 and P2 is aP2=0.77×R1.

The third region 10 merges here into the second convex region 9 via a tangent 17 applied at point P2. A radial distance between the points P2 and P3 is aP3=0.225×R$_2$. At the same time, the third region 10 merges into the fourth convex region 11 via a tangent which is applied at the point P4 and is not shown.

A bulge in the fourth convex region 11 has an axial height here of approx. 0.15 mm. The axial height h refers here to the height in the axial direction of the compressor wheel 1.

With reference to a diameter of the compressor wheel 1, a bulge radius R4 in the fourth convex region 11 is a quarter of the diameter D of the compressor wheel (R4≈D/4=R/2). The circle formed by the radius R4 intersects the point P5, which is located at the outer diameter, and at the same time determines the position of the point P4 by a vertical intersection through the central point M of the circle and the undulating profile 13.

All embodiments have in common, that there are no depressions in the wheel back 6 extending in the direction of the blades 5 which are axially deeper than the point P5 on the outside diameter. Thus an outer contour of the wheel back 6 does not intersect at any point a radial line 18 passing through the point P5, but may only be tangent to this line. Thus, no strength-reducing depressions exist.

Looking further at FIG. 1, it can be seen that the hub 4 reaches from an axis of rotation 14 as far as the first region 8 and has a flat annular end surface 15. Said flat end surface 15 has in this case a radial extent of approx. 15% of the radius R of the compressor wheel 1.

The first concave region 8 in turn has a radial extent of approx. 7% of the radius R of the compressor wheel 1, while the second convex region 9 has a radial extent of approx. 25% of the radius R of the compressor wheel 1. Looking at the third concave region 10, it can be seen that the latter has a radial extent of approx. 30% of the radius R of the compressor wheel 1, while the radial extent of the fourth convex region 11 is approx. 20% of the radius R. The radial extents of the end surface 15 and of the individual regions 8 to 11 together produce approx. 97% of the radius R of the compressor wheel 1, since a blade tip 16 still protrudes slightly in the radial direction over the wheel back 6.

Looking at the profile 12 of a wheel back of a compressor wheel known from the prior art with the profile 13 according to the invention of the wheel back 6 of the compressor wheel 1 according to the invention, it can be seen that the wheel back 6 is thickened in particular in the two convex regions 9 and 11 since the stress loading and therefore also the tendency to cracking are at the greatest in said regions. By means of the local thickening of the wheel back 6 in the two convex regions 9, 11, a reinforcement of the wheel back 6 can therefore be obtained exclusively in the required stress-loaded regions and, as a result, a minimizing of the tendency to cracking can be achieved with minimal additional weight. In addition, of course, the hub 4 can also be thickened by approx. 0.9<H<1.2 mm in the region of the end surface 15. The height H of the thickening or of the step in the region of the hub 4 corresponds here to $H\approx 0.016 \times D$.

The high stress in this area can thus be better absorbed. It is particularly advantageous that a through hole 19 for receiving a shaft extends directly to the end surface 15 without any widening of the through hole. Only a small bevel is provided.

With the undulating profile 13 according to the invention of the wheel back 6, the life expectancy can be increased by 50 to 100% in comparison to previous compressor wheels.

The invention claimed is:

1. A compressor wheel of a charging device, comprising: a hub, a plurality of blades and a wheel back, wherein the wheel back has an undulating profile which extends from the hub in a radial direction, the undulating profile including a plurality of regions which emerge from the hub in the radial direction and adjoin one another, wherein the plurality of regions of the undulating profile include:

a first concave region;

a second convex region adjoining the first concave region;

a third concave region adjoining the second convex region; and a fourth convex region adjoining the third concave region; and wherein at least one of the first concave region has a radial extent of approx. 7% of a radius of the compressor wheel, and the fourth convex region has a radial extent of approx. 20% of a radius of the compressor wheel.

2. The compressor wheel according to claim 1, wherein the fourth convex region includes a bulge that has an axial height of approx. 0.15 mm.

3. The compressor wheel according to claim 1, wherein the hub extends from an axis of rotation to the first concave region and the hub includes a flat end surface.

4. The compressor wheel according to claim 3, wherein the flat end surface has a radial extent of approx. 15% of the radius of the compressor wheel.

5. The compressor wheel according to claim 1, wherein the first concave region has a radial extent of approx. 7% of the radius of the compressor wheel.

6. The compressor wheel according to claim 1, wherein the second convex region has the radial extent of approx. 25% of the radius of the compressor wheel, and the fourth convex region has the radial extent of approx. 20% of the radius of the compressor wheel.

7. The compressor wheel according to claim 1, wherein the third concave region has a radial extent of approx. 30% of the radius of the compressor wheel.

8. An exhaust gas turbocharger, comprising: a compressor wheel, the compressor wheel including:

a hub;

a plurality of blades; and a wheel back, the wheel back having an undulating profile that extends from the hub in a radial direction;

the undulating profile including a plurality of regions extending from the hub in the radial direction, wherein the plurality of regions of the undulating profile include a first concave region, a second convex region, a third concave region, and a fourth convex region;

wherein the second convex region is disposed between the first concave region and the third concave region, and the third concave region is disposed between the second convex region and the fourth convex region; and wherein at least one of:

the first concave region has a radial extent of approx. 7% of a radius of the compressor wheel;

the second convex region has a radial extent of approx. 25% of a radius of the compressor wheel;

wherein the third concave region has a radial extent of approx. 30% of a radius of the compressor wheel; and wherein the fourth convex region has a radial extent of approx. 20% of a radius of the compressor wheel.

9. The exhaust gas turbocharger according to claim 8, wherein the plurality of regions adjoin one another such that the second convex region adjoins the first concave region, the third concave region adjoins the second convex region, and the fourth convex region adjoins the third concave region.

10. The exhaust gas turbocharger according to claim 8, wherein the fourth convex region includes a bulge that has an axial height of approx. 0.15 mm.

11. The exhaust gas turbocharger according to claim 8, wherein the hub extends from an axis of rotation to the first concave region.

12. The exhaust gas turbocharger according to claim 11, wherein the hub has a flat axial end surface.

13. The exhaust gas turbocharger according to claim 12, wherein the flat axial end surface has a radial extent of approx. 15% of the radius of the compressor wheel.

14. The exhaust gas turbocharger according to claim 8, wherein the first concave region has the radial extent of approx. 7% of the radius of the compressor wheel.

15. The exhaust gas turbocharger according to claim 8, wherein the second convex region has the radial extent of approx. 25% of the radius of the compressor wheel.

16. The exhaust gas turbocharger according to claim 8, wherein the third concave region has the radial extent of approx. 30% of the radius of the compressor wheel.

17. The exhaust gas turbocharger according to claim 8, wherein the fourth convex region has the radial extent of approx. 20% of the radius of the compressor wheel.

18. The exhaust gas turbocharger according to claim 8, wherein the first concave region has the radial extent of approx. 7% of the radius of the compressor wheel, the second convex region has the radial extent of approx. 25% of the radius of the compressor wheel, the third concave region has the radial extent of approx. 30% of the radius of the compressor wheel, and the fourth convex region has the radial extent of approx. 20% of the radius of the compressor wheel.

19. A compressor wheel for a charging device, comprising:

a hub, a plurality of blades, and a wheel back;

the wheel back having an undulating profile extending from the hub in a radial direction, the undulating profile including a plurality of regions that emerge from the hub in the radial direction and adjoin one another, and wherein the plurality of regions of the undulating profile include:

a first concave region;

a second convex region adjoining the first concave region;

a third concave region adjoining the second convex region; and a fourth convex region adjoining the third concave region, wherein the fourth convex region includes a bulge that has an axial height of approx. 0.15 mm.

20. The compressor wheel according to claim 19, wherein at least one of:

the first concave region has a radial extent of approx. 7% of a radius of the compressor wheel;

the second convex region has a radial extent of approx. 25% of a radius of the compressor wheel;

the third concave region has a radial extent of approx. 30% of a radius of the compressor wheel; and the fourth convex region has a radial extent of approx. 20% of a radius of the compressor wheel.

* * * * *